(12) United States Patent
Cole

(10) Patent No.: US 6,609,603 B2
(45) Date of Patent: Aug. 26, 2003

(54) FLIP CHUTE SAFETY AND ASSIST MECHANISM

(75) Inventor: Larry Cole, Ingersoll (CA)

(73) Assignee: London Machinery Inc., London (CA)

( * ) Notice: Subject to any disclaimer, the term of this patent is extended or adjusted under 35 U.S.C. 154(b) by 8 days.

(21) Appl. No.: 09/882,058

(22) Filed: Jun. 18, 2001

(65) Prior Publication Data

US 2002/0189916 A1 Dec. 19, 2002

(51) Int. Cl.[7] .............................................. B65G 11/00
(52) U.S. Cl. ........................................ 193/10; 414/523
(58) Field of Search ...................... 193/4–6, 10, 2 A, 193/16; 414/523; 366/9, 13, 41

(56) References Cited

U.S. PATENT DOCUMENTS 2,968,382 A * 1/1961 Oury ........................... 193/10
3,456,769 A * 7/1969 Prichard et al. ................ 193/4
4,190,144 A * 2/1980 Lybbert ....................... 193/10
4,711,334 A * 12/1987 Barry et al. .................. 193/10
5,660,260 A 8/1997 Bareiss ........................ 193/10

* cited by examiner

Primary Examiner—Christopher P. Ellis
Assistant Examiner—Richard Ridley
(74) Attorney, Agent, or Firm—Gowling Lafleur Henderson LLP

(57) ABSTRACT

A safety and assist mechanism for a flip chute hingedly connectable to a main chute for movement about a transverse hinge axis between a stored position over the main chute and a working position as an extension to the main chute. The mechanism has a lever rigidly securable to the flip chute to rotate with the flip chute about the hinge axis. A spring is connectable to the lever and to the main chute to generate a moment about the hinge axis contra to a moment generated by the weight of the flip chute.

19 Claims, 5 Drawing Sheets

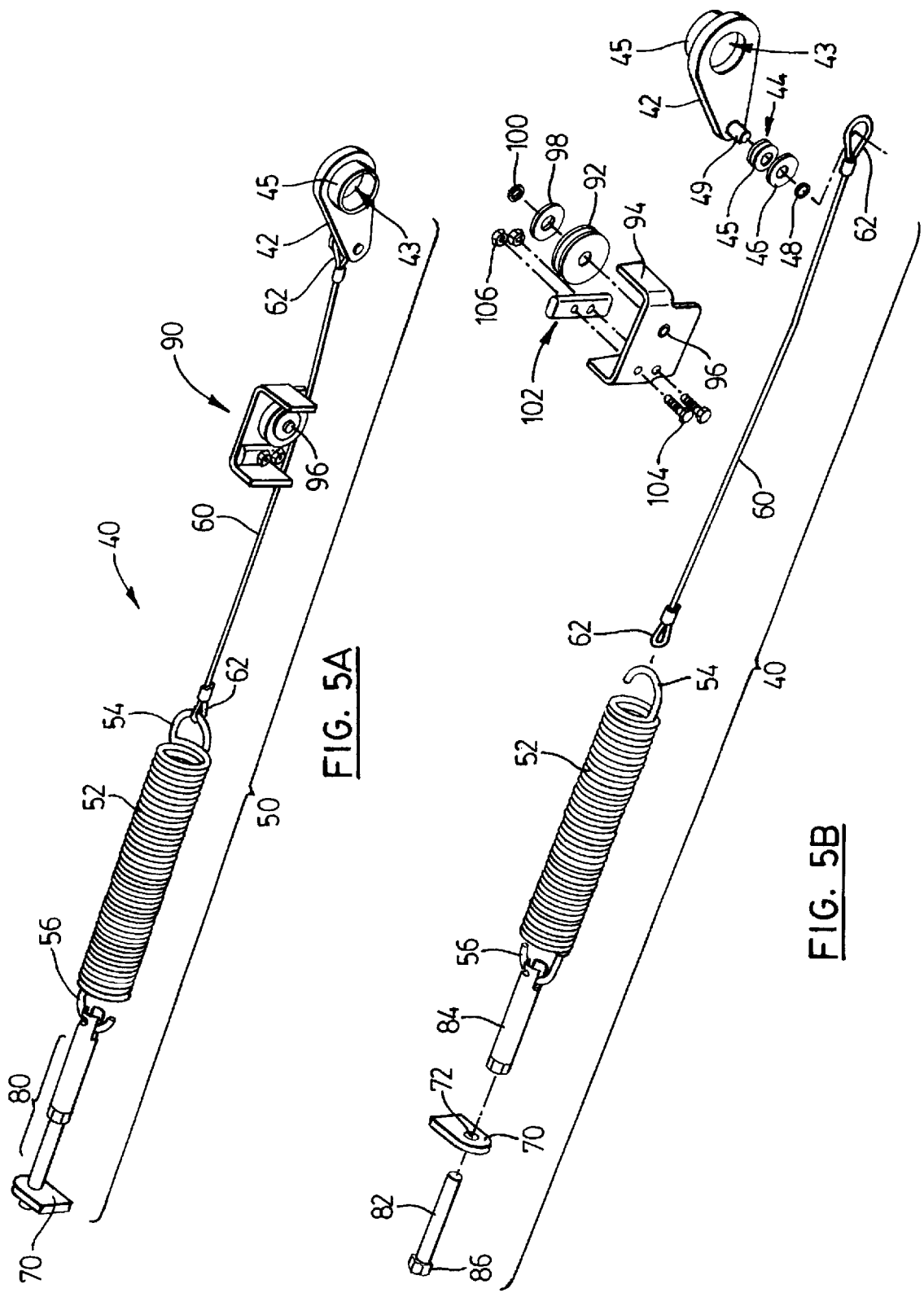

FLIP CHUTE SAFETY AND ASSIST MECHANISM

FIELD OF THE INVENTION

This invention relates generally to safety apparatus for concrete mixers. More particularly, this invention relates to apparatus for controlling the closing force of a flip chute portion of a concrete discharge chute.

BACKGROUND OF THE INVENTION

An apparatus commonly used to discharge concrete from a concrete mixer such as one carried by a concrete mixer truck is referred to as a "discharge chute". The discharge chute is mounted at a discharge end of the concrete mixer, and is basically an upwardly opening channel extending from the discharge end for guiding the flow of concrete being discharged.

In order to achieve a workable compromise between having as long a chute as possible without having interference from the chute when it is not required, such as during transport of the concrete mixer, discharge chutes are generally made collapsible.

A common way of making the discharge chute collapsible is to make it of two hingedly connected sections, which may be placed end to end in a "working position" for discharge and placed one above the other into a "stored position". The two parts of the discharge chute are referred to as the "main chute" and the "flip chute". The main chute is the first run of the discharge chute adjacent to the discharge end of the concrete mixer and that part of the discharge chute typically mounted to the concrete mixer (or structure supporting the concrete mixer). The flip chute is the second or lower run of the discharge chute hingedly connected at an upper edge to an upper edge of the main chute so as to be pivotal through an arc of approximately 180° between the stored position and the working position.

Like the main chute, the flip chute is typically a steel construction and of significant mass. The pivoting of the flip chute is commonly a manual operation and its weight generally maintains it in both the stored and the working positions.

As the flip chute is pivoted or rotated from the stored position to the working position, it would normally begin to fall after its centre of gravity passes a transverse hinge axis about which the hinge pivots. If not guided by an operator it will fall until fully open (ie. in the working position) at which time the flip chute and the main chute engage with sufficient force to create a severe pinch zone. The pinch zone poses a significant safety risk and has resulted in hand injuries resulting in loss of fingers.

It is an object of the present invention to provide a safety mechanism for counteracting the closing force of the flip chute as it approaches the working position to reduce the pinching force in the pinch zone.

It is a further object of the present invention to provide an assist mechanism to reduce the force required to initiate movement of the flip chute away from its stored position.

SUMMARY OF THE INVENTION

In very general terms, the present invention provides apparatus for generating a moment of desired direction and amount about the hinge axis to reduce the moment which would otherwise be caused about the hinge axis by the weight of the flip chute acting through its centre of gravity.

A flip chute safety and assist mechanism is provided for a flip chute hingedly connectable to a main chute for movement about a transverse hinge axis between a stored position over the main chute and a working position as an extension to the main chute, through an over centre position. The mechanism has a first member rigidly securable to the flip chute to extend away from the hinge axis and rotate with the flip chute about the hinge axis. The mechanism further has biasing means connectable to the first member and to the main chute to generate a moment about the hinge axis contra to a moment generated by the weight of the flip chute as the flip chute approaches its working position.

The biasing means may be connectable to the first member and to the main chute to generate a moment about the hinge axis contra to a moment generated thereabout by the weight of the flip chute.

The first member may be a lever and the biasing means may include a spring.

The spring may be connected to the lever by a cable connected at one end to the spring and at an opposite end to the lever.

The mechanism may include a guide wheel for engaging and locating the cable, the guide wheel being rotatably mounted to a guide wheel bracket securable to the main chute.

The biasing means may include an adjuster for varying the tension exerted on the lever by the spring. The adjuster may include an anchor securable to the main chute and an adjustable length link for connecting the spring to the anchor. The adjustable length link may include a rod threadedly engaging a tube.

A foldable chute is also provided having a main chute, a flip chute hingedly connected to the main chute for movement about a transverse hinge axis between a stored position over the main chute and a working position as an extension to the main chute, through an over centre position wherein the centre of gravity of the flip chute is above the hinged axis. The foldable chute further includes a safety and assist mechanism connected thereto in accordance with the flip chute safety and assist mechanism described above.

DESCRIPTION OF THE DRAWINGS

Preferred embodiments of the present invention are described below with reference to the accompanying drawings in which:

FIG. 5 is a perspective view of a pair of flip chute safety assist mechanisms according to the present invention with one of the pair in an assembled configuration and the other in an exploded configuration.

DESCRIPTION OF PREFERRED EMBODIMENTS

Figure 1:
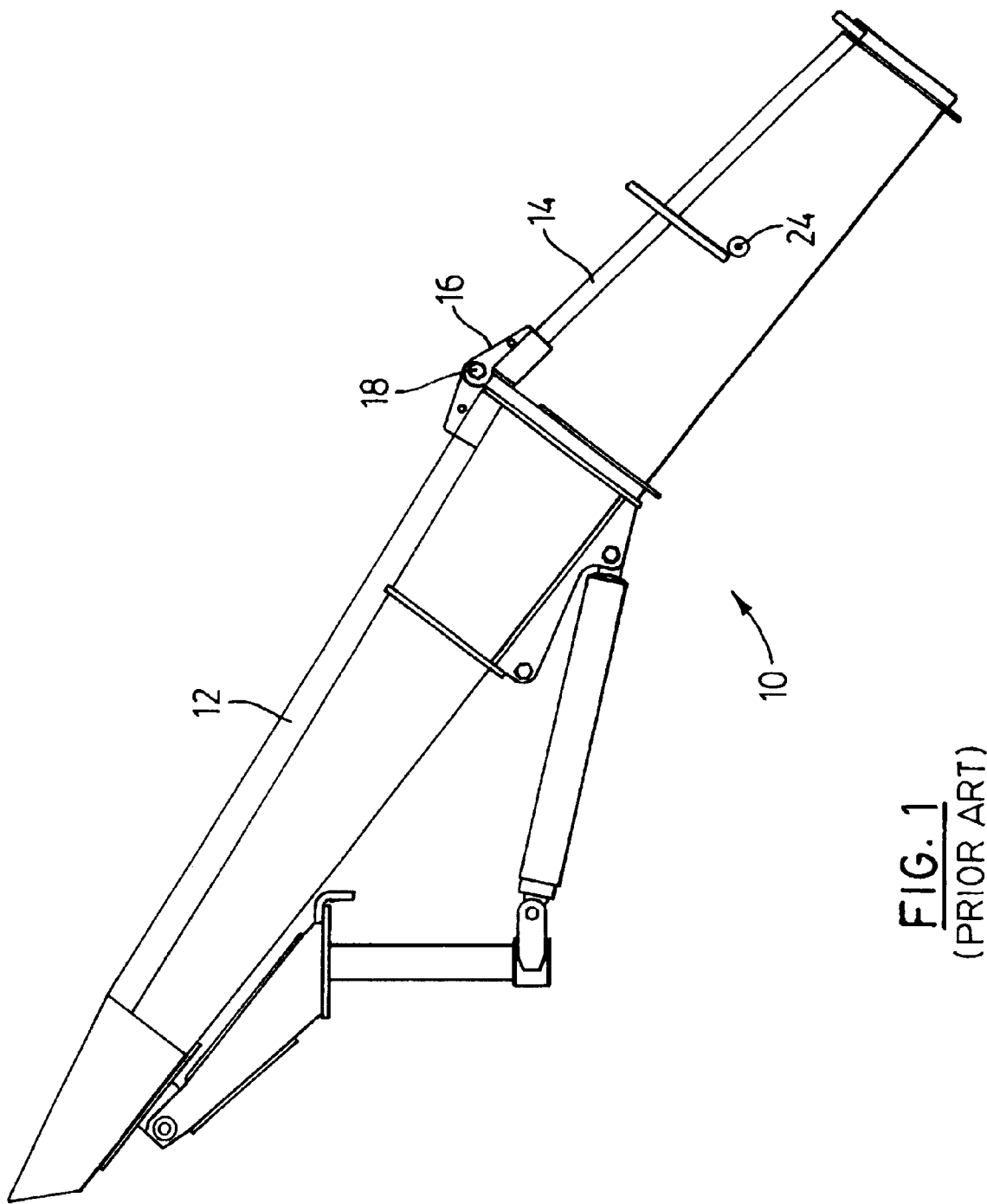
FIG. 1 is a front elevation illustrating a prior art chute in its working position.
Figure 2:
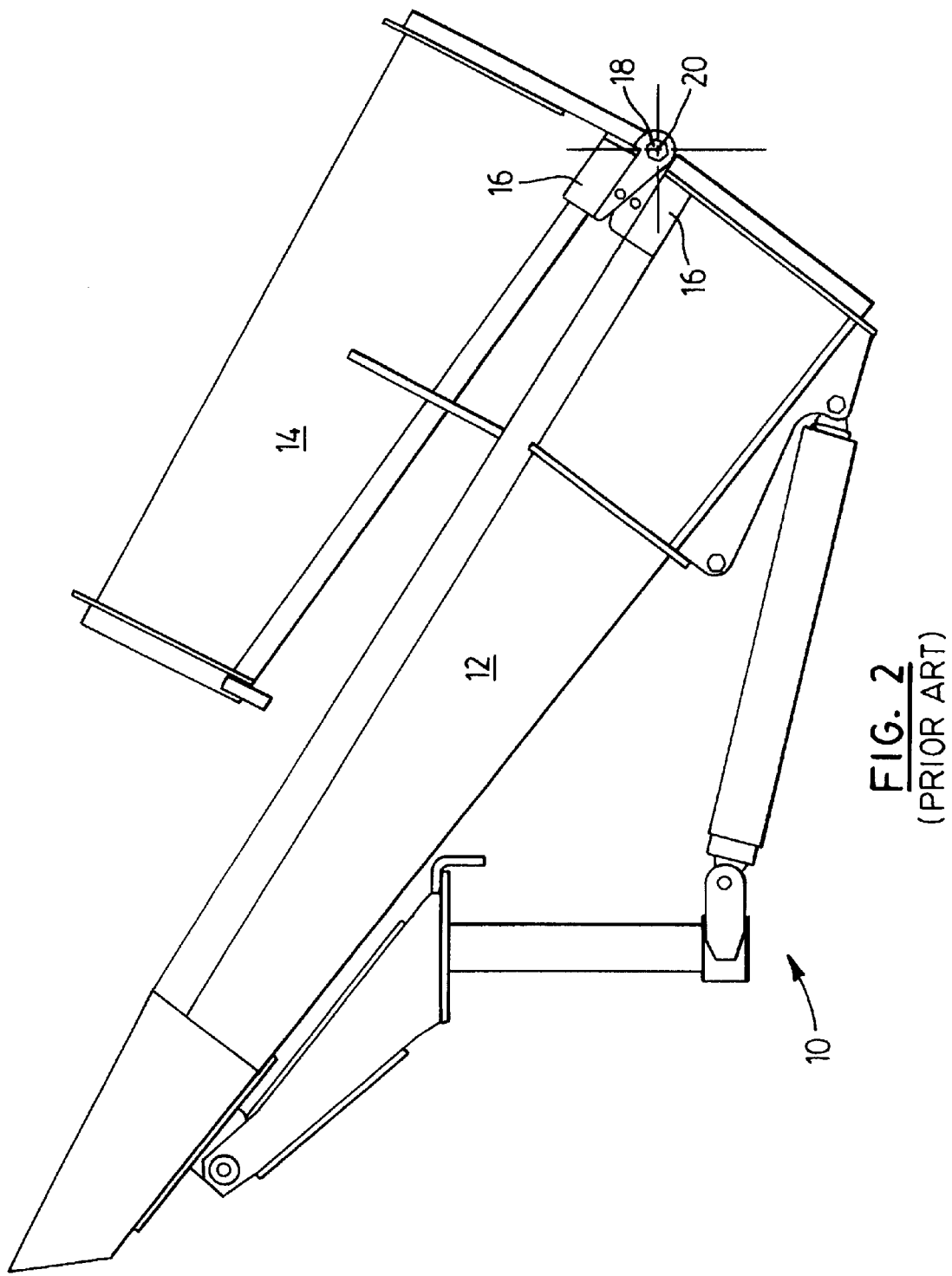
FIG. 2 is a front elevation illustrating a prior art chute in its stored position.

A discharge chute is generally indicated by reference 10 in the accompanying illustrations. The discharge chute 10 comprises a main chute 12 and a flip chute 14. The flip chute 14 is hingedly connected to the main chute 12 by respective hinge members 16 secured to the adjacent upper edges of the main chute 12 and the flip chute 14. By virtue of the hinged connection, the flip chute is movable about a transverse hinge axis 20 from a working position illustrated in FIG. 1 to a stored position illustrated in FIG. 2.

In the stored position the flip chute 14 is disposed over the main chute 12. In the working position, the flip chute 14 abuts against the main chute 12 and acts as an extension of the main chute 12. In passing between the working and stored positions, the centre of gravity, indicated by reference 24 passes through an over centre position directly above the hinge axis 20.

To the left (as illustrated) of the over centre position, the weight of the flip chute 14 urges it toward the stored position. To the right (as illustrated) of the over centre position, the weight of the flip chute 14 urges it toward the working position.

According to the present invention, a safety and assist mechanism generally indicated by reference 40 is provided which acts contra to the movement about the hinge axis 20 generated by the weight of the flip chute 14 acting through its centre of gravity 24. The safety and assist mechanism 40, or simply "mechanism 40" includes a first member which may be a lever 42 rigidly securable to the flip chute 14 (such as by welding) and a biasing means 50, such as the spring arrangement illustrated, for applying force to the lever 42 to generate a moment about the hinge axis 20 opposite to the moment generated by the weight of the flip chute 14. For safety concerns it would suffice to have the moment generated by the mechanism 40 as the flip chute 14 approaches its working position. The lever 42 and the biasing means may preferably also be arranged to provide assistance to an operator in moving the flip chute 14 out of its stored position.

Various apparatus may be adopted to act as the biasing means 50. A coil spring and cable arrangement is described in detail below as likely being:

(a) best suited for the environment which includes abrasive and somewhat corrosive concrete;
(b) simple to adjust and maintain;
(c) relatively inexpensive;
(d) simple to install and retrofit; and
(e) adaptable to provide both the safety and the assist moments.

Other biasing means might include a gas strut, a hydraulic or friction dampener, a torsion or leaf spring.

Figure 3:
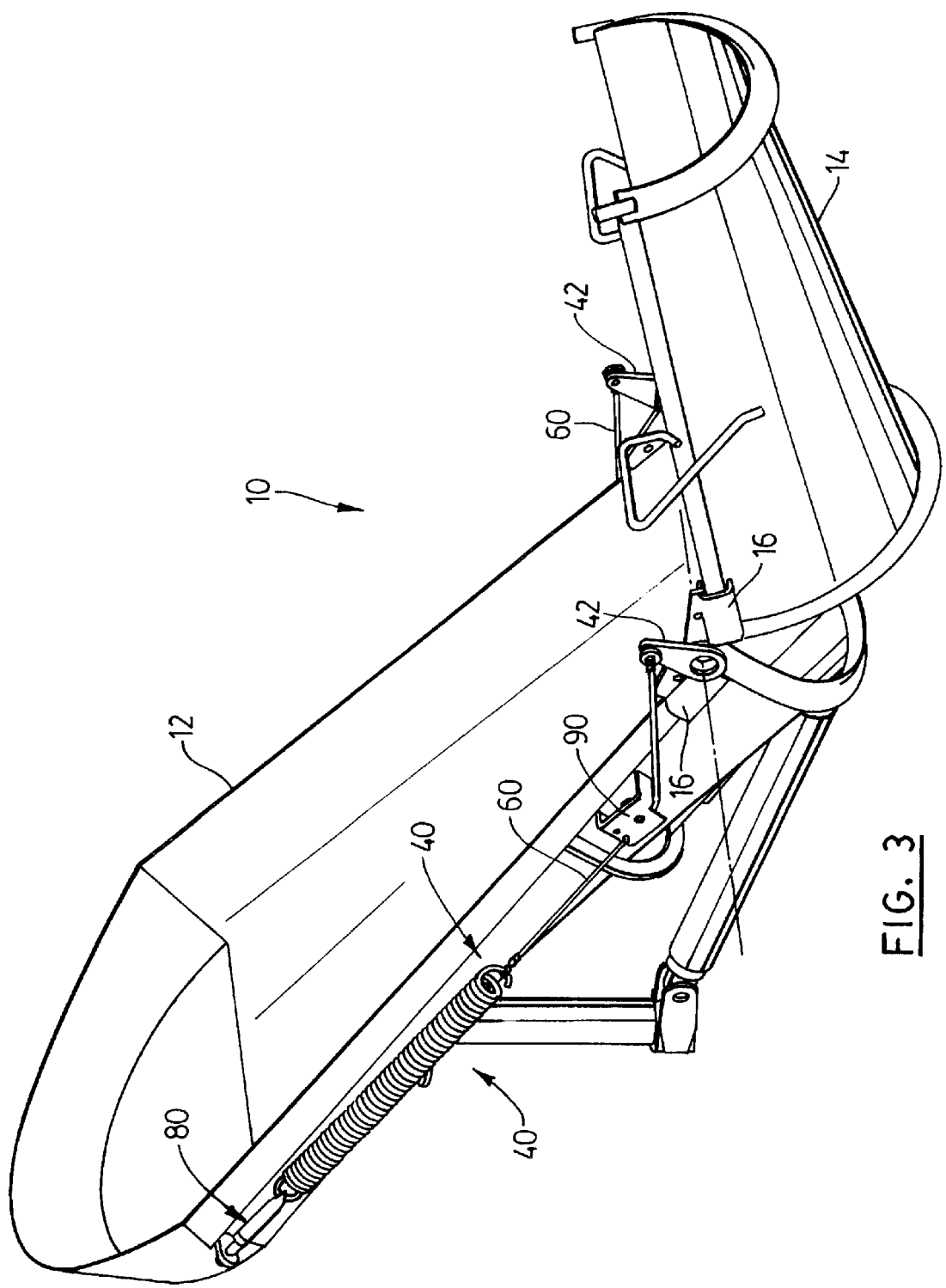
FIG. 3 is a perspective view of a flip chute and a main chute having a flip chute safety assist mechanism according to the present invention.
Figure 4:
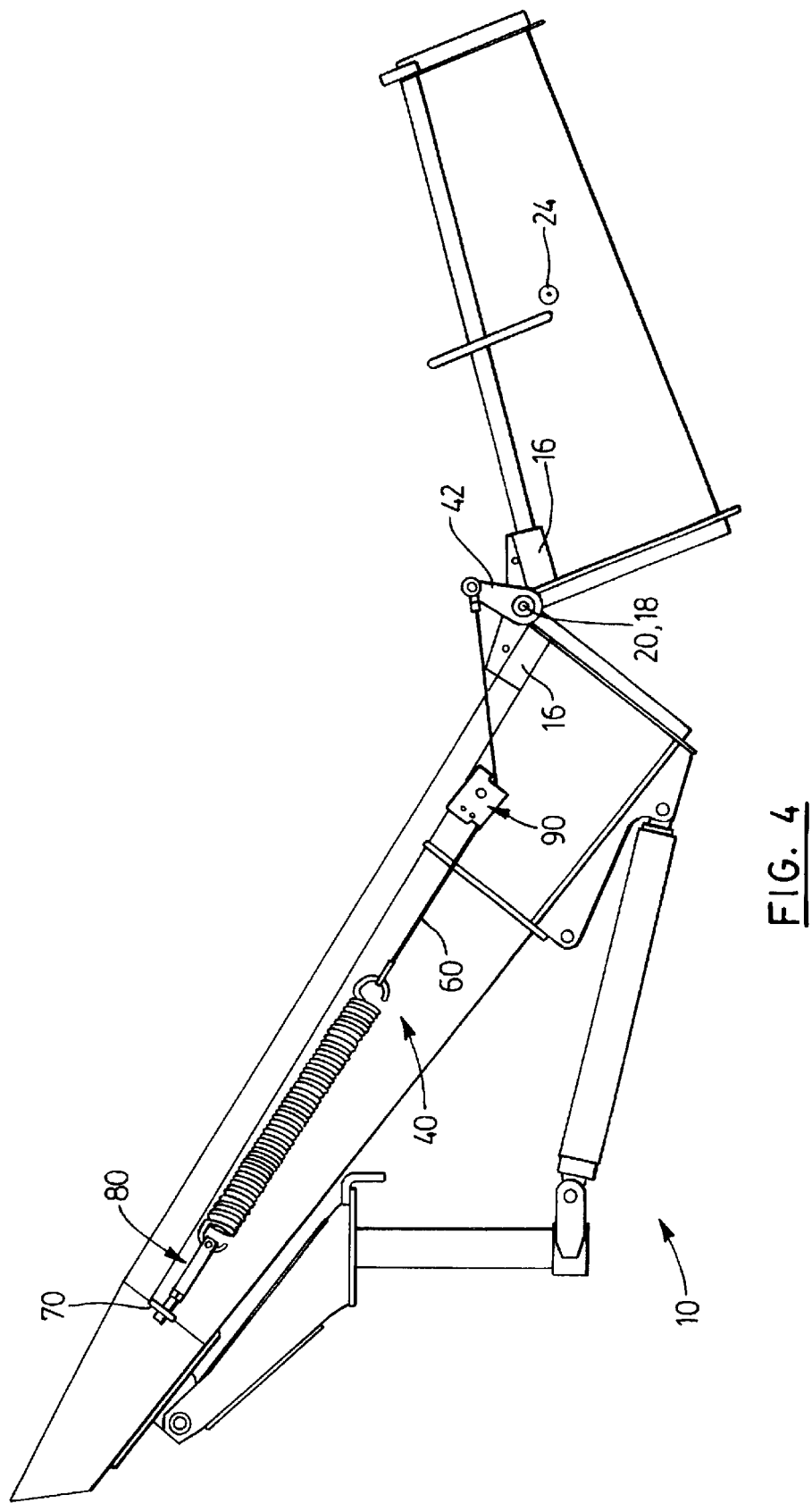
FIG. 4 is a front elevation corresponding to FIG. 3.

As illustrated in FIGS. 3, 4 and 5, the biasing means 50 includes a spring 52 operably connected at a cable end 54 to the lever 42 by a cable 60 extending therebetween. An anchor end 56 of the spring 52 is connected to an anchor 70 by an adjustable link 80. The anchor 70 would typically be rigidly secured to the main chute 12 such as by welding.

The adjustable link 80 allows spring tension to be adjusted both on the initial assembly and further to compensate for changes in spring tension during the life of the spring 52 such as gradual stretching of the spring 52. The adjustable link illustrated includes a bolt or rod 82 which extends through a hole 72 in the anchor 70 and threadedly engages a tube 84 to which the spring 52 is connected. The rod 82 has an enlarged head 86 which abuts against the anchor to prevent passage through the hole 72.

Other apparatus may be considered in lieu of the rod and tube arrangement illustrated. For example a turnbuckle may be used at either end of the spring. Alternatively the anchor 70 could be mounted on an adjustable bracket in turn secured to the main chute 12. No doubt further arrangements may be apparent to those skilled in such structures.

The cable 60 has a loop 62 at each of its ends. The cable 60 may be secured to the lever 42 by placing a loop 62 over a cable bearing 44 securable by a retaining washer 46 and a snap ring 48 to a mounting post 49 extending from the lever 42. The cable bearing 44 has a groove 45 extending thereabout for positioning the cable 60. The bearing reduces chafing of the cable 60 by providing a rotatable coupling between the loop 62 and the mounting post 49.

To avoid having the entire biasing means 50 pivot about the anchor 70 and increase the displacement of the cable end 54 of the spring 52, a cable guide 90 is provided. The cable guide 90 has a grooved guidewheel 92 rotatably mounted to a guidewheel bracket 94 which is rigidly securable to the main chute 12 such as by welding. The guidewheel 92 may be secured to a guidewheel post 96 extending from the guidewheel bracket 94 by a washer 98 retained by a snap ring 100. The cable guide 90 also enables optimization of the position of the cable 60.

To avoid chafing of the guidewheel bracket 94 by the cable 60, a guide rub block 102 may be secured to the guidewheel bracket 94 by bolts 104 and nuts 106.

The hinge members 16 which connect the main chute 12 and the flip chute 14 include some form of a hinge pin 18 therebetween which may be removable to enable attachment and removal of the flip chute 14 to or from the main chute 12 as may be required for assembly or replacement of worn or damaged components. Preferably the lever 42 will not interfere with access to the hinge pin 18 and accordingly the lever 42 may be provided with an access opening 43 and an annular weldment lug 45 extending about the access opening 43 and the hinge pin 18. The weldment lug 45 would be the part of the lever 42 welded to the hinge member 16.

It will be appreciated that orientation of the lever will determine the direction of the movement exerted by the biasing means 50 about the hinge axis 20. As the amount of movement required diminishes toward the over centre position, it may be preferable to align the lever 42 to have the spring 52 at its shortest when the flip chute 14 is in the over centre position. Deviations from such an orientation may be made if it is preferred to have a greater or lesser movement about the hinge axis 16 either toward the working or the stored position.

In a presently preferred embodiment, when the flip chute 14 is in its working position, the lever 42 is arranged to provide a small contra moment to the weight moment of the flip chute 14. At this point, the spring 52 is at its maximum extension, and hence exerting its maximum force. In order to avoid having a contra moment so large as to overcome the weight moment of the flip chute, the effective lever arm must be relatively small. Were this not the case, the flip chute 14 would not remain in its working position.

In order to achieve a small effective lever arm, the lever 42 may be oriented to be approximately 10° in the direction of the impending circular motion, when the flip chute 14 is in its working position. This may be achieved by having the lever 42 aligned such that a line drawn from the pivot axis 20 through the centre of the lever pin 49 would be aligned with the centre line of the cable 60. This would be a configuration wherein zero contra moment is applied.

As the flip chute 14 is lifted from the working position toward its stored position, its weight moment increases for approximately the first 70° of articulation. After the first 30° of articulation, the effective lever arm and the spring force are such as to just overcome the weight moment. Were there no friction in the system, the flip chute 14 would now move to its stored position without further assist. In practice, the flip chute remains in a balanced state requiring a lightly applied force to move up or down.

Continuing from 70° to about 160°, the weight moment and the contra moment decrease in proportion such that the flip chute 14 remains in balance. At this point, the flip chute centre of gravity 24, goes "over centre" with respect to the pivot axis 20. For a small number of degrees further movement, the spring system and the flip chute weight act together to direct the flip chute towards its stored position. The effective lever arm becomes zero at 170° of articulation because of the 10° advance. The spring is now at its minimum extension.

The total articulation of the flip chute 14 is approximately 185° to 190°. During the last 15° to 20° of articulation, the weight moment of the flip chute 14, increases toward the stored position. The lever and spring system will provide an opposite increase in moment. The net effect will be to cause the weight moment to be reduced but not overcome.

Conversely, to move the flip chute 14 from its stored position to its working position, the spring and lever system will assist the initial effort making it easier for the operator to move the flip chute 14. The flip chute 14 is then suspended for most of its rotation requiring a small applied force to move it toward its working position.

The above description is intended in an illustrative rather than a restrictive sense. Variations to the exact structures described may be apparent to those skilled in such mechanisms without departing from the spirit and scope of the invention which is defined by the claims set out below.

I claim:

1. A flip chute safety and assist mechanism for a flip chute hingedly connectable to a main chute for movement about a transverse hinge axis between a stored position over said main chute and working position as an extension to said main chute through an over centre position, said mechanism comprising:
    a first member rigidly securable to said flip chute to extend away from said hinge axis and rotate with said flip chute about said hinge axis; and,
    biasing means connectable to said first member and to said main chute to generate a moment about said hinge axis contra to a moment generated by the weight of said flip chute as said flip chute approaches said working position and said stored position.

2. A flip chute safety and assist mechanism for a flip chute hingedly connectable to a main chute for movement about a transverse hinge axis between a stored position and a working position through an over centre position, said mechanism comprising:
    a first member rigidly securable to said flip chute to extend away from said hinge axis and rotate with said flip chute about said hinge axis; and
    biasing means connectable said first member and to said main chute to generate a moment about said hinge axis contra to a moment generated thereabout by the weight of said flip chute as said flip chute is moved toward either of said stored and said working positions to assist initial movement of said flip chute away from said stored and said working positions and to reduce a pinching force between said main chute and said flip chute.

3. A flip chute safety and assist mechanism as claimed in claim 1 wherein said first member is a lever.

4. A flip chute safety and assist mechanism as claimed in claim 3 wherein said biasing means include a spring.

5. A flip chute safety and assist mechanism as claimed in claim 4 wherein said spring is connected to said lever by a cable connected at one end to said spring and at an opposite end to said lever.

6. A flip chute safety and assist mechanism as claimed in claim 5 wherein said mechanism further includes a guidewheel for engaging and locating said cable, said guidewheel being rotatably mounted to a guidewheel bracket securable to said main chute.

7. A flip chute safety and assist mechanism as claimed in claim 5 wherein said biasing means includes an adjuster for varying the tension exerted on said lever by said spring.

8. A flip chute safety and assist mechanism as claimed in claim 7 wherein said adjuster includes:
    an anchor securable to said main chute; and
    an adjustable length link for connecting said spring to said anchor.

9. A flip chute safety and assist mechanism as claimed in claim 8 wherein said adjustable length link includes a rod threadedly engaging a tube.

10. A foldable chute comprising:
    a main chute;
    a flip chute hingedly connected to said main chute for movement about a transverse hinge axis between a stored position over said main chute and a working position as an extension to said main chute through an over centre position wherein the centre of gravity of said flip chute is above said hinge axis; and
    a safety and assist mechanism connected to said main chute and said flip chute to exert a moment on said flip chute about said hinge axis relative to said main chute contra to a moment exerted by the weight of said flip chute as said flip chute is moved toward either of said stored and said working positions to assist initial movement of said flip chute away from said stored and said working positions and to reduce a pinching force between said main chute and said flip chute;
    said safety and assist mechanism having a lever rigidly secured at a chute end to said flip chute extending away from said hinge axis and
    biasing means connected to said main chute and to said lever at a connector location radially outwardly of said chute end for applying a biasing force on said lever to urge said lever toward said main chute.

11. A foldable chute as claimed in claim 10 wherein said lever is oriented to have said biasing force act contra to said moment generated by the weight of said flip chute as said flip chute is moved toward either of said stored and said working positions to assist initial movement of said flip chute away from said stored and said working positions and to reduce a pinching force between said main chute and said flip chute.

12. A foldable chute as claimed in claim 11 wherein said biasing means includes a spring.

13. A foldable chute as claimed in claim 12 wherein said spring is connected to said lever by a cable.

14. A foldable chute as claimed in claim 13 wherein said safety and assist mechanism further includes guidewheel rotatably secured to said main chute by a guidewheel bracket, said guidewheel engaging and locating said cable.

15. A foldable chute as claimed in claim 14 wherein said biasing means includes a tension adjuster for varying the tension exerted on said lever by said spring.

16. A foldable chute as claimed in claim 15 wherein said adjuster includes an anchor secured to said main chute and an adjustable length link for connecting said spring to said anchor.

17. A foldable chute as claimed in claim 16 wherein said adjustable length link includes a rod threadedly engaging a tube.

18. A foldable chute as claimed in claim 12 wherein said foldable chute has a pair of said safety and assist mechanisms, one of said pair being mounted on two respective opposite sides of said foldable chute.

19. A foldable chute as claimed in claim 17 having said safety and assist mechanism duplicated on opposite sides thereof.

* * * * *